US006523675B1

(12) United States Patent
Romeder

(10) Patent No.: US 6,523,675 B1
(45) Date of Patent: Feb. 25, 2003

(54) CIRCULATING MAILING ITEM CONTAINER IN A SORTING DEVICE

(75) Inventor: Josef Romeder, München (DE)

(73) Assignee: Siemens Aktiengesselschaft, Munich (DE)

( * ) Notice: Subject to any disclaimer, the term of this patent is extended or adjusted under 35 U.S.C. 154(b) by 0 days.

(21) Appl. No.: 09/830,665

(22) PCT Filed: Oct. 15, 1999

(86) PCT No.: PCT/DE99/03315

§ 371 (c)(1),
(2), (4) Date: Jun. 20, 2001

(87) PCT Pub. No.: WO00/26129

PCT Pub. Date: May 11, 2000

(30) Foreign Application Priority Data

Oct. 30, 1998 (DE) ........................................ 198 50 174

(51) Int. Cl.[7] ................................................ B65G 47/38
(52) U.S. Cl. ........................................ 198/704; 198/703
(58) Field of Search ............................ 198/370.05, 703, 198/704, 701, 713; 209/911

(56) References Cited

U.S. PATENT DOCUMENTS 4,509,635 A * 4/1985 Emsley et al. .............. 534/678
5,535,874 A * 7/1996 Ross et al. ............... 198/477.1
5,718,321 A * 2/1998 Brugger et al. ............. 198/359
6,095,315 A * 8/2000 Andersch et al. ....... 198/370.03

FOREIGN PATENT DOCUMENTS

DE 43 23 564 A1 1/1995
DE 4323564 * 1/1995
DE 195 33 118 C1 11/1996
DE 19533118 * 11/1996

* cited by examiner

*Primary Examiner*—Khoi M. Tran
(74) *Attorney, Agent, or Firm*—Venable; Robert Kinberg

(57) ABSTRACT

The invention relates to a mail-item container of a sorting device for the controlled transfer of a flat mail item into stationary sorting containers, the container having a stationary wall part and a movable wall part that is disposed at the front in the transport direction, and is inclined counter to the transport direction and has a slide part. In accordance with the invention, the slide part is embodied to swing, completely or partially, such that the front portions of the mail items are given momentum as they slide out, due to a swinging movement of the slide part that is initiated by the opening of the movable wall part, the momentum preventing short mail items from overturning due to the torque generated by gravity; the swinging duration is at least long enough that the respective short mail item has already exited the slide part at the time of the next swinging movement directed at the mail items.

4 Claims, 2 Drawing Sheets

CIRCULATING MAILING ITEM CONTAINER IN A SORTING DEVICE

BACKGROUND OF THE INVENTION

The invention relates to a circulating mail-item container.

In known sorting devices, each mail item to be sorted is transported into a circulating mail-item container, which is open at the top, after the item has been separated and its distribution information has been read (DE 43 23 564 A1).

The mail-item containers, which are arranged in rows, move past stationary sorting containers arranged in rows. Each sorting container is associated with specific distribution information. The relevant mail-item container is opened above the sorting container associated with the detected distribution information (e.g., recipient address) during transport, and the respective mail item drops into the sorting container due to gravity. The transport speed of the mail-item containers and the speed at which the mail items slide out are matched to one another such that the mail items drop into the sorting containers virtually vertically, in a horizontal position. It is necessary for the mail items to come to rest in the sorting containers with a defined orientation, for example with the distribution information on top. The mail-item containers respectively comprise a stationary wall part and a movable wall part, which pivots about an axis of rotation oriented transversely to the transport direction. A holding part, which can be unlocked, holds the wall parts closed at the bottom. When the mail-item container is located above the sorting container into which the mail item is to be deposited, a release mechanism unlocks the holding part of the mail-item container, and the movable wall part swings downward. This forms a slot, through which the mail item slides downward along the movable wall part and into the sorting container. To improve the sliding-out action, the movable wall part has a slide part that adjoins the slot and is inclined counter to the transport direction of the mail-item containers. Despite this, the ma il items traverse a more or less long free-fall path before coming to rest. It has been observed that short mail items tip downward when exiting the slide part, and overturn while falling. Thus, a defined orientation of the mail-item position in the sorting container, for example with the address side always up, is not assured.

SUMMARY OF THE INVENTION

The object of the invention is to create a circulating mail-item container for receiving, transporting and transferring a flat mail item, with control, during downward transport into stationary sorting containers or compartments, the container having a stationary wall part and a movable wall part with a slide part; the embodiment extensively prevents short mail items from overturning as they fall into the sorting containers or compartments.

As a consequence of the swinging of the at least partially swinging slide part, which is initiated by the sudden opening of the movable wall part, as well as of the selection of the swinging duration, as long as the centers of gravity of the mail items remain on the slide part, the front portion of the mail items is given momentum, which counteracts the torque generated by gravity after the center of gravity of short mail items has left the slide part. The swinging duration is selected such that the next swinging movement directed toward the mail item does not occur until the respective short mail item has completely left the slide part. This prevents a rotation of these items that would initiate a turnover. As the length and weight of the mail items increase, this effect is reduced proportionally, because the center of gravity still does not lie outside of the slide part, so the front part can only be tilted upward. The next swinging movement gives momentum to the rear portion of the mail item, seen in the direction of movement, but, because of the greater mass of the mail item, this momentum does not have a perceptible effect on the dropping behavior of the longer mail item, which is not critical, unlike in short mail items.

It is advantageous to embody the slide part completely or partly from an elastic material in order to realize the swinging capability.

In a further advantageous embodiment the swinging capability is realized by securing the rigid slide part, or a portion thereof, to a hinge.

It is advantageous to provide the wall parts and the slide part with longitudinal grooves to improve the sliding out of the mail items when the mail-item container is open.

The invention is described in detail below by way of an embodiment illustrated in the drawing.

DETAIL DESCRIPTION OF THE INVENTION

Figure 1:
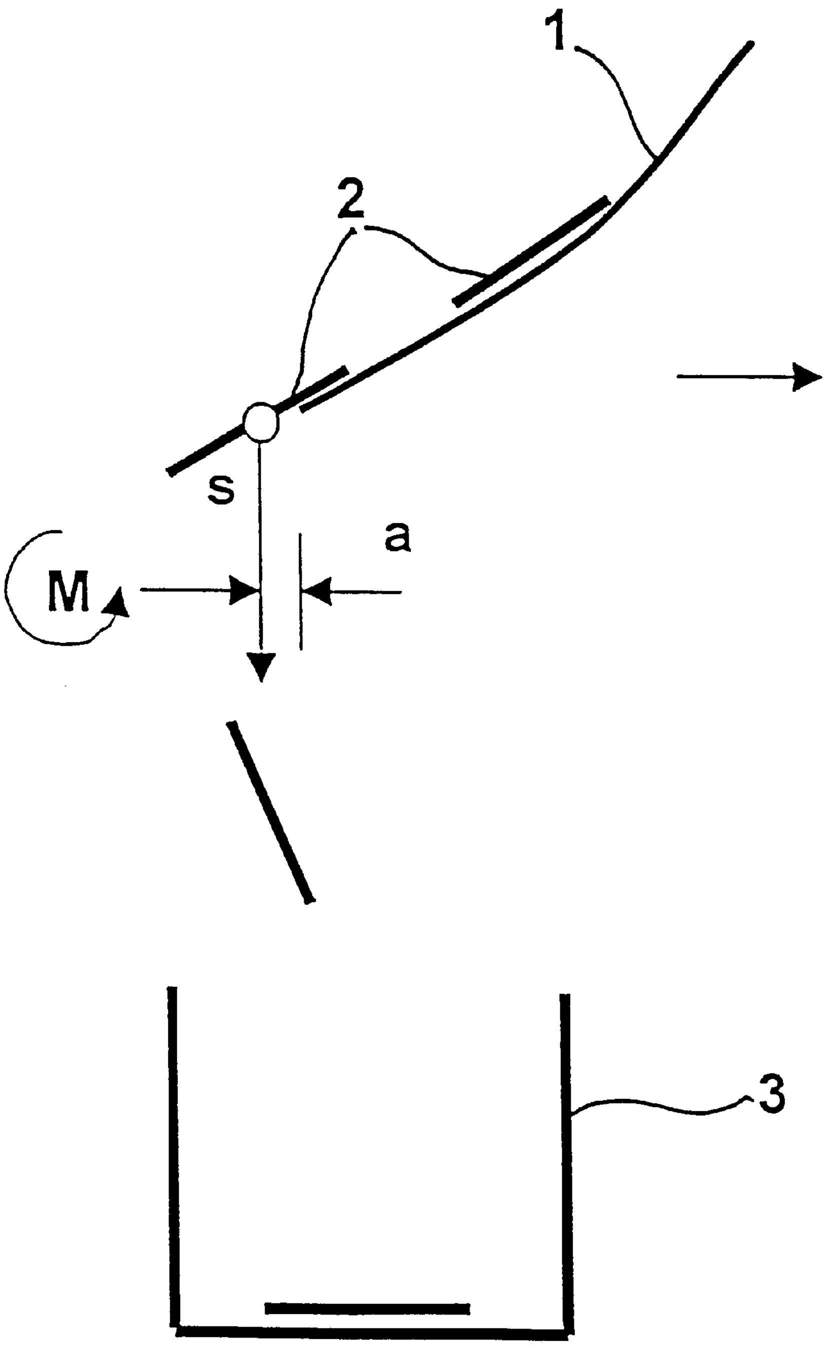
FIG 1 (PRIOR ART)
FIG. 1 a schematic representation of the course of movement of the mail items from a movable mail-item container having a rigid slide part, and into a sorting container, in accordance with the state of the technology.

FIG. 1 briefly and schematically outlines the procedure known from the state of the technology. The mail-item container is not shown in its entirety. The figure only shows the wall part 1, which is located at the front in the transport direction of the mail-item containers (indicated by the arrow), is disposed to move and is inclined counter to the transport direction, with a rigid slide part being shown in the open state. The position of the short mail item 2 exiting the transport container is shown at different times. The transport containers move to the right, in the arrow direction, and the mail item 2 slides downward on the open, movable wall part 1 with the adjoining, rigid slide part; the two are not distinguished in the drawing. The movements are matched to one another such that the mail item drops virtually vertically into the sorting container 3. If the mail item 2 is located at the outer edge of the slide part, and its center of gravity s is already located outside of the slide part, at a distance a from the edge of the slide part, gravity exerts a torque M onto the mail item 2 over this distance, which causes the item to overturn as it drops into the sorting container 3, as shown.

Figure 2:
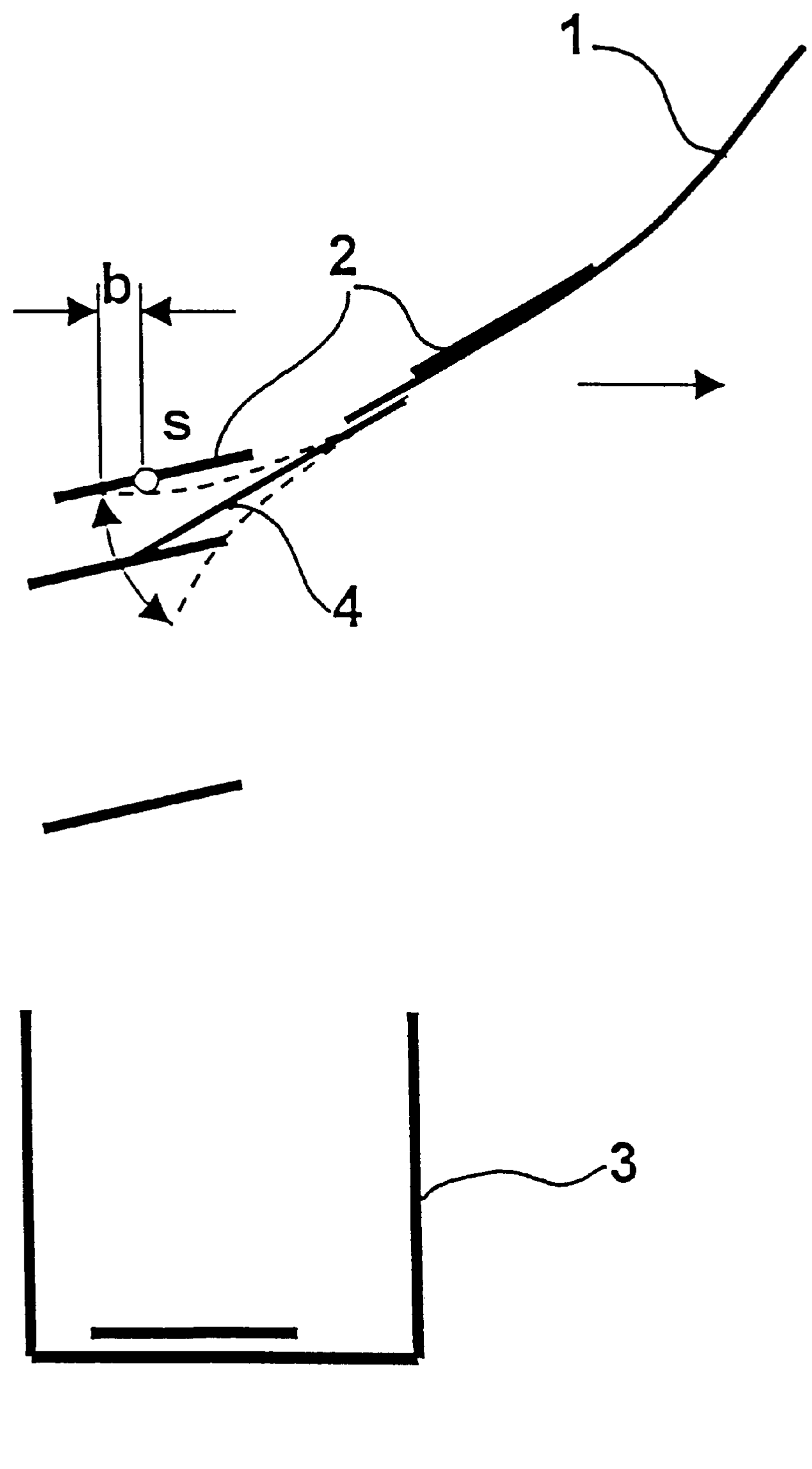
FIG. 2 a schematic representation of the course of movement of the mail items from a moving mail-item container having an additional, elastic slide part, and into a sorting container.

FIG. 2 also schematically illustrates the course of movement of the short mail item from the mail-item container into the sorting container, but here an elastic slide part 4 has additionally been mounted to the rigid slide part; the deflection movements of the elastic slide part are shown in dashed lines. It is also possible, of course, to produce the entire slide part from an elastic material, or to secure a rigid part to a hinge to allow it to swing. The selected embodiment depends on the concrete conditions, such as the mail-item spectrum, the transport speed, the sliding speed and sliding direction, and the properties of the elastic material. If the mail-item container is opened at a predetermined location due to the unlocking of the movable wall part 1, the elastic slide part 4 begins to swing. The dimensioning and the selection of material properties are established such that a short mail item 2 that is presently exiting the elastic slide part 4, and whose center of gravity s is still located on the slide part, gains momentum at a distance b from the center of gravity, which counteracts the torque that is generated by gravity and can cause short mail items to overturn. The swinging duration is selected such that the next swinging movement oriented in the direction of the mail item does not occur until the respective short mail item 2 has completely exited the elastic slide part 4. This prevents a momentum in the direction of the gravity-induced torque that causes overturning. On the other hand, the swinging properties of the elastic slide part 4 were set such that the momentum originating from the slide part 4 does not generate a torque, which causes overturning, in the opposite direction of rotation. The position of the mail-item container with the movable wall part 1 and the slide part 4, as shown in FIG. 2, is only assumed at the time at which the mail item 2 sliding out is given momentum from the elastic slide part 4. As the mail item 2 continues to fall, the mail-item container moves further in the arrow direction.

What is claimed is:

1. A circulating mail-item container of a sorting device for receiving, transporting and transferring a flat mail item, with control, during downward transport into stationary sorting containers or compartments, with each mail-item container having a stationary wall part and a movable wall part, which has a slide part that is lengthened relative to the fixed wall part, the movable wall part being in the front in the transport direction, and inclined counter to the transport direction, and forming a receiving pocket for the mail items in the closed position, and forming a transfer slot that leads downward in the transfer position, and with the speed of the mail-item containers and the sliding speed and direction of the mail items from the mail-item containers being matched to one another such that the mail items drop virtually vertically into the sorting containers in a horizontal position, characterized in that the slide part is embodied, partly or in its entirety, to swing such that, as long as the centers of gravity of the mail items remain on the slide part, the front portions of the mail items are given momentum as they slide out, due to a swinging movement of the slide part that is initiated by the opening of the movable wall part, the momentum preventing short mail items from overturning due to the torque generated by gravity when the centers of gravity of the mail items are located outside of the slide part, with the swinging duration being at least long enough that the respective short mail item has already exited the slide part at the time of the next swinging movement directed toward the mail items.

2. The circulating mail-item container according to claim 1, characterized in that the slide part completely or partially comprises an elastic material.

3. The circulating mail-item container according to claim 1, characterized in that the slide part has a rigid portion that is secured to a hinge so as to swing.

4. The circulating mail-item container according to claim 1, characterized in that the wall parts and the slide part have longitudinal grooves.

* * * * *